United States Patent [19]
Gottfried

[11] Patent Number: 4,768,179
[45] Date of Patent: Aug. 30, 1988

[54] OPTICAL DISC STORE SCANNING DEVICE WITH A PLURALITY OF SCANNING UNITS

[75] Inventor: Norbert Gottfried, Baldham, Fed. Rep. of Germany

[73] Assignee: Siemens Aktiengesellschaft, Berlin and Munich, Fed. Rep. of Germany

[21] Appl. No.: 900,800

[22] Filed: Aug. 27, 1986

[30] Foreign Application Priority Data

Aug. 27, 1985 [DE] Fed. Rep. of Germany ....... 3530609

[51] Int. Cl.$^4$ .............................................. G11B 7/08
[52] U.S. Cl. ........................................ 369/32; 369/33; 369/44; 369/45
[58] Field of Search ...................... 369/32, 33, 41, 44, 369/45, 46, 112; 358/907; 365/215, 234

[56] References Cited

U.S. PATENT DOCUMENTS

| 3,737,877 | 6/1973 | Feinleib | 369/32 |
| 4,094,010 | 6/1978 | Pepperl et al. | 365/215 |
| 4,550,249 | 10/1985 | Damen et al. | 369/44 |

FOREIGN PATENT DOCUMENTS

| 0115666 | 8/1984 | European Pat. Off. | |
| 2335861 | 7/1977 | France | |
| 147507 | 12/1978 | Japan | 369/45 |
| 123071 | 6/1986 | Japan | 369/32 |
| 1534025 | 11/1978 | United Kingdom | |
| 2071359 | 9/1981 | United Kingdom | |

OTHER PUBLICATIONS

R. L. Garwin, "Optics for Beam Addressable Files", *IBM Technical Disclosure Bulletin*, vol. 15, No. 2, Jul. 1972, pp. 494–495.

Abstract of Japanese Patent 59-168942, *Patents Abstracts of Japan*, vol. 9, No. 24(P-331)(1747), Jan. 31, 1985.

Abstract of Japanese Patent 53-147507, *Patents Abstracts of Japan*, vol. 3, No. 18 (E-91), Feb. 16, 1979.

*Primary Examiner*—William N. Beha, Jr.
*Attorney, Agent, or Firm*—Hill, Van Santen, Steadman & Simpson

[57] ABSTRACT

A positioning device for optical disk storage having a laser light source for creating a light beam, a scanning arrangement including an arrangement to focus the light beam onto a selected information track of the optical storage, a control unit, an arrangement for coarse positioning of the beam and an arrangement for fine positioning of the beam, which include a regulating loop in cooperation with a detector arrangement to produce track error signals and focus error signals characterized by the storage disk being divided into a plurality of concentric track zones with each zone comprising an plurality of information tracks, the scanning arrangement being sub-divided into a plurality of scanning units with one scanning unit for each of the concentric track zones and the units being arranged next to each other on a line which is preferably a segment of an arc, an arrangement for displacing each of the units relative to the line with the coarse positioning arrangement comprising a rotatable reflector mounted in the path of the light from a focussing arrangement and reflecting the light at one of the selected scanning units.

9 Claims, 2 Drawing Sheets

OPTICAL DISC STORE SCANNING DEVICE WITH A PLURALITY OF SCANNING UNITS

BACKGROUND OF THE INVENTION

The invention is directed to a positioning device for an optical disc storage which has a scanning unit, a control unit, a laser light source creating a light beam which is focussed onto the selected information track of an optical storage disc and means provided for coarse positioning the scanning unit and means for fine positioning the scanning unit which means form a regulating loop in cooperation with the detector arrangements which produces track error signals and focal error signals for the scanning unit.

In disc stores, whether a magnetic or optical type, the characteristics of the positioning device are always essentially important. Technological advances have allowed an increase in storage capacity and here an increase in track density is of particular interest, but, at the same time, every effort has been made to reduce the average access time in order to increase the efficiency of the disc store.

Therefore, there has been no lack of attempts to fulfill the inherently contradictory requirements of a short access time and a high track density. In a positioning system, a moving mass normally occurs in the form of a scanning unit which moves fundamentally radially to the storage disc. In particular, in magnetic disc stores, technical advances, in particular relating to the magnetic heads, have permitted a substantial reduction in the mass of the scanning unit which must be necessarily moved and has thus, also permitted a high speed positioning system. However, because in optical imaging systems it is more difficult to reduce the moving mass of the scanning unit, different technological limits exist.

A relatively high access speed, for example, a high speed radial movement of the positioning device in the case of track changes, can also be more easily achieved in a known manner with positioning devices of a multi-stage design. Here, a coarse positioning of the scanning unit, whether it is a magnetic right head or an optical scanner, is carried out to a track area as close as possible to the selected data track or to the selected data track itself. This coarse positioning is then followed by a fine positioning, which either adjusts the scanning unit to the selected track and/or holds this track position. This division of the positioning procedure into two stages, which comprise a high translation speed in the first stage and a precise fine positioning in the second stage on average permits an optimized access time under the existing limiting conditions using two control systems.

Optical data stores are generally used only for filing purposes so that here the problem of average access time during the continuous read-out of large quantities of data is not of such a decisive importance. If, however, optical data stores are to compete with magnetic disc stores, for example, optical stores are to be able to be used for operating modes involving frequent track changes, very short access times must be feasible in these data stores. Hitherto, this problem has not been satisfactorily solved, in particular, due to the inertia of the positioning device which in turn in governed by the mass of the scanning unit which is to be moved in the radial direction.

SUMMARY OF THE INVENTION

It is the object of the present invention to provide a positioning device for an optical disc store of the type which has a laser beam for creating a laser light, scanning means including means for focussing the laser light onto a selected information track and means provided for both coarse positioning and fine positioning which positioning device permits substantially shorter access times in as much as the product of the mass and acceleration of the moving parts of the positioning device is considerably reduced.

This aim is accomplished in an improvement in a positioning device for an optical disc store, said device having a laser light source creating a light beam, and means for scanning including means to focus the light beam into select information tracks of the optical disc storage, means for coarse positioning and means for fine positioning which forms a regulation loop in cooperation with the detector arrangement which produces track error signals and focus error signals and a control unit. The improvements are that the disc storage is divided into a plurality of concentric track zones, each of which comprises a plurality of information tracks and that the scanning means includes a plurality of scanning units with a scanning unit for each of the individual track zones positioned above the zone on a line, means for displacing each of the individual scanning units relative to the line for fine positioning, said means for coarse positioning comprising a light reflector unit being positioned in the laser beam path between the light source and the individual scanning units, means for providing said rotating reflector so as to deflect the laser beam into a selected unit assigned to a selected track zone.

In the known, multi-stage positioning devices, it has been previously attempted to optimize the movement function, in particular, in the delay phase of the scanning unit with a reduced moving mass. However, the proposed solution does not adopt this coarse positioning and does not involve the movement of the scanning unit. A movement of the scanning unit relative to a line during the positioning procedure now occurs only in fine positioning. The accelerations are now substantially reduced since even for a jump from one track to a track far removed therefrom, only a very short distance is possible between a small number of tracks within the track zone.

On the other hand, the mass inertia of the positioning device becomes substantially less problematic and on the other hand, the control system is also substantially simplified since the zone which is to be controlled relates to only a fraction of the overall storage area. Since the scanning units can be considered to represent fundamentally stationary units which need to be linearly displaced only to a limited extent, this will apply to the mechanical construction. Other, simpler construction principles can be used than in a design in which the scanning unit must be able to be radially displaced over the entire storage area of the storage unit. However, this also applies to determination of the actual value during the control process in the fine positioning and the regulating variable to be derived therefrom as this control system need function with high precision only in respect to a narrow track zone which has a width that is dependent upon the number of existing scanning units.

A high level of flexibility is inherent in this concept because, depending upon other limiting conditions for a selected storage model, possibilities exist for determining the width of the track zone which width governs the fine positioning by an appropriate number of scanning units in accordance with the improvements of the present invention.

Other advantages and features of the invention will be readily apparent from the following description, drawings and claims.

DESCRIPTION OF THE PREFERRED EMBODIMENTS

Figure 1:
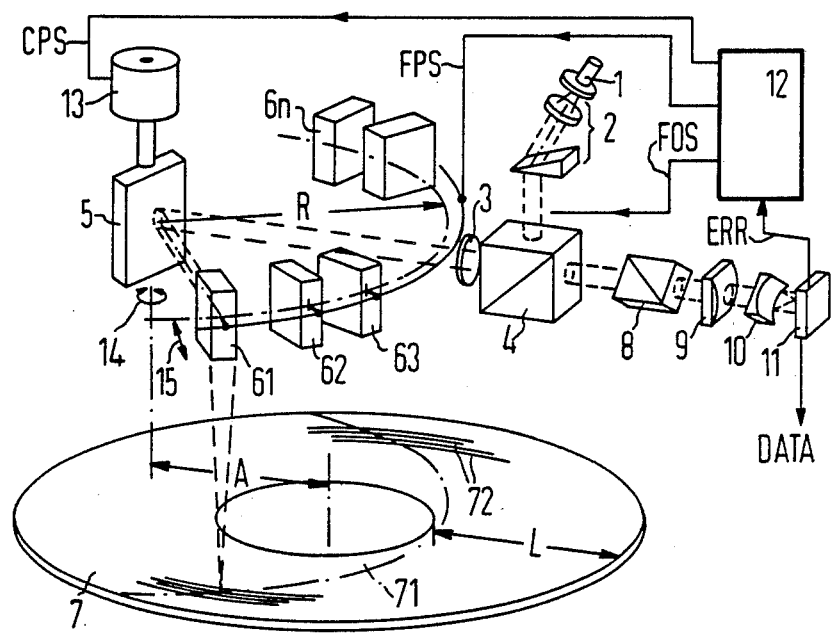
FIG. 1 is a schematic perspective view of an optical disc storage with a corresponding positioning device in accordance with the principles of the present invention.

The principles of the present invention are particularly usefuly in a optical disc storage system schematically illustrated in FIG. 1. The storage system includes a laser diode 1, which emits polarized light and is the light source for the optical disc storage system. As indicated, the light is focussed by an optical system 2, which consists of a prism and a collimator lens. The parallel light beam from the optical system 2 is now fed to a beam divider 4 from where it has a portion deflected through a focussing optic 3, to be desribed in greater detail, towards a rotary reflector 5. From the rotary reflector 5 the light is reflected to one of a plurality of scanning units 61, 62, 63 . . . 6n. Here, the angular setting of the rotary reflector 5 will determine which of the scanning units is selected and, as illustrated, the scanning unit 61 is selected in the arrangement of FIG. 1. The selected scanning unit contains an optical imaging device which will be described in greater detail and which will focus the parallel light beam onto the surface of a storage disc 7.

During a read process, the light reflected by the surface of the storage disc 7 is received by a selected scanning unit which in turn reflects it towards the rotary reflector 5 which in turn reflects it back through the focussing optics 3 to the beam divider 4. Now, because of different directions of propagation, the light is gated out of the described beam path and this gated light is analized by an optical receiving system wherein the information is obtained in the form of read data signals DATA or error signals ERR. The error signals ERR are control information for the positioning device.

In accordance with the illustration in FIG. 1, the optical analizing system contains a Wollaston or Rochon polarizer 8 which splits the received light into two linearly polarized sub-beams whose polarization planes are at right angles to one another. In the present example, the two sub-beams are directed by a collective lens 9 in combination with a cylindrical lens 10 onto a detector arrangement 11 at two image points locally offset from one another. In known manners, the detector arrangement 11 can contain two four-quadrant photodetectors, the individual detector surfaces of which suitably combine with one another permit the acquisition of the read data signals DATA and the error signals ERR which are control signals for a track follow-up system and a focussing system respectively of the positioning device.

The error signals ERR are fed as a control value to a schematically illustrated control unit 12 which will emit three types of further control signals by way of regulating variables for the positioning device. These regulating variables represent on the one hand, a coarse positioning signal CPS, a fine positioning signal FPS and finally, a focus control signal FOS.

The coarse positioning signal CPS is fed to a control device 13 for the rotary reflector 5. The control device 13 can consist, for example, of a rotary electro magnet arrangement to which the coarse positioning signal CPS is fed as a static signal which defines a specific angular position for the rotary magnet. The control device 13 could also be a stepping motor, which is directly driven either via a digital coarse positioning signal CPS or via an analogue/digital converted coarse positioning signal CPS.

As schematically illustrated in FIG. 1 by the arrows 14, the angular position of the control device 13, which is determined this way, governs the rotary position of the rotary reflector 5 which thereby deflects the light beam received by the beam divider 4 onto the scanning unit selected in this way, which, in the drawings, is the scanning unit 61. FIG. 1 schematically illustrates that "n" scanning units are provided and are arranged in a plane horizontal to the storage disc 7 on a segment of a circle relative to the rotary reflector 5 in a regular distribution.

Geometrically the axis of rotation for the rotary reflector 5 is located to be parallel to the axis of rotation for the storage disc 7 at a determined lateral spacing A. Facing towards the rotary reflector 5, the scanning units 61, 62 . . . 6n are located on a circular segment having a radius R in a regular distribution so as to produce a track line 71, which has been schematically illustrated on the storage disc 7 and which extends over the entire data strip comprising schematically indicated data tracks 72.

The third parameter, which governs the geometry of the positioning device, is the number "n" of scanning units. A simple consideration will indicate that with the arrangement of the "n" scanning units, the full width of the scanning strip of the storge disc 7 can be covered if the data strip is divided into "n" track zones which comprise a minimum of s/n data tracks, where "s" will be assumed to represent the total number of tracks in the data zone of the storage disc 7.

This geometry of the positioning device determines a minimum travel of the scanning units relative to the line of the segment, which travel is indicated in FIG. 1 by the arrow 15 as radial travel. Obviously, the travel of the individual units, such as the unit 61, is substantially less than the total width of the data strip of the storage disc 7 provided and is of a correspondingly high value. If L is used to designate the path difference between the outermost disc track, which in FIG. 1 coincides with the edge of the storage disc 7, and the innermost disc track, wherein the radial travel of the individual scanning units, for example, 61, correspond to the quotient of L/n. As will be clear, the maximum time required for the track selection $t_{sp}$, which is for the stroke movement of a selected scanning unit, is governed by the equation:

$$t_{sp} = 2\sqrt{\frac{L}{|b|}} \cdot \sqrt{\frac{1}{n}}$$

where the speed curve of the stroke movement is based on the assumption of a triangular profile. Here, $|b|$ represents an acceleration or delay of the deflected scanning unit which can be considered in simplified forms to be a constant.

As schematically illustrated in FIG. 1, the stroke movement of the selected scanning unit is controlled by a fine positioning signal FPS as a regulating variable which, in the regulating loop, assumes and is maintained at a value 0 as soon as the predetermined track has been discovered using known methods.

Figure 2:
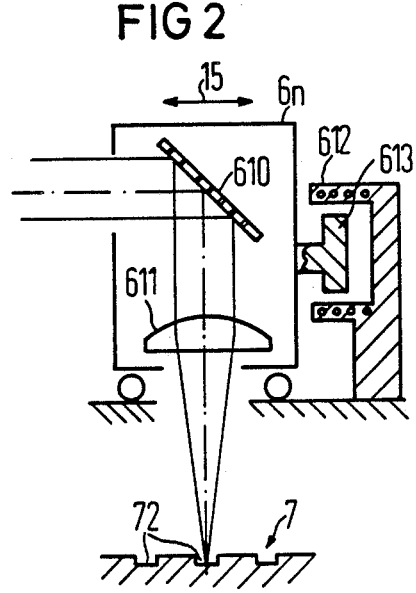
FIG. 2 is a schematic cross sectional view of an individual scanning unit of the present invention.

A construction of any one of the scanning units $6n$ is illustrated in FIG. 2. By way of optical systems, the scanning unit consists of a deflecting reflector 610 which is inclined at an angle 45° and which will deflect the light beam received in a horizontal direction into a vertically directed light beam. The unit further includes a focussing optic device 611 which will focus the parallel light onto the surface of the storage disc 7 and into a data track 72.

As represented in simplified form in FIG. 2, this scanning unit is to be displaceable in the direction of the arrow 15 which indicates the stroke movement of the scanning unit. In particular, due to the relative short stroke, this can be achieved very easily, for example, by means of a plunger arrangement wherein a plunger electro magnet 612, which represents the basic mass, is stationary and the armature 613, which is mobile in relation thereto, is permanently connected to the linearly displaceable scanning unit $6n$.

Normally, the conventional scanning head in optical data stores is also displaceable in a vertical direction, for example, at right angles to the storage disc, in order to maintain the focus of the laser light on the active surface of the storage disc 7. With the geometric arrangement of the scanning unit as described in the foregoing on a segment of a circle extending about the center of the rotating reflector 5, the advantageous possibility exists of setting and readjusting the focus of the laser beam to the storage disc by means of an optical device attached to the frame.

Figure 3:
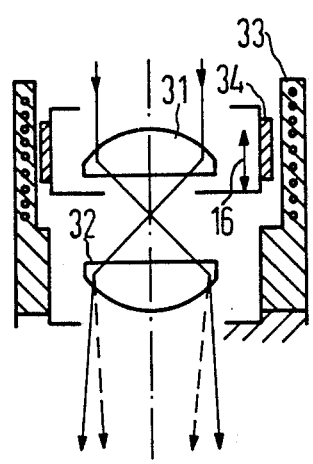
FIG. 3 is a schematic cross sectional presentation of a focussing optics in accordance with the present invention.
Figure 4:
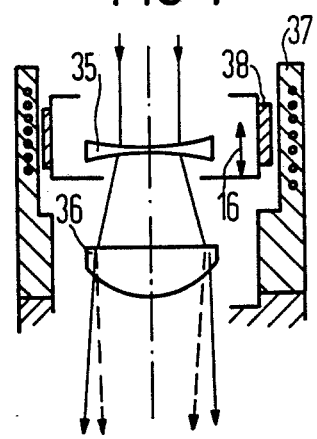
FIG. 4 is a schematic cross sectional view of an embodiment of the focussing optics utilized in the present invention.

For this purpose, the aforementioned focussing optic device 3 is arranged in the beam path following the beam divider 4 and before the light strikes the rotary reflector 5. The focussing device 3 can have two different embodiments, which are illustrated in FIGS. 3 and 4. Considered with the optical system, this focussing optic consists of an arrangement of two collective focussing elements 31 and 32, which, in the embodiment of FIG. 3, produce a real intermediate image and a scattering focussing element 35 and a collecting focussing element 36 which produce a virtual intermediate image as illustrated in FIG. 4. Here, the focussing elements 32 of FIG. 3 and 36 of FIG. 4 are both stationarily mounted in a frame. However, the element 31 of FIG. 3 and the elment 35 of FIG. 4 are displaceable along the direction of the beam path.

Linear movement can again be achieved, for example, by means of a plunger system, wherein a plunger magnet 33 of FIG. 3 and 37 of FIG. 4 are stationary. The associate armature 34 of FIG. 3 is permanently connected to the mounting of the focussing element 31 while the element 35 is permanently connected to an associated armature 38 in FIG. 4. The electro magnetic plunger systems 33, 34 and 37, 38 are controlled by the aforementioned focus control signal FOS.

The moving parts of the described focussing optics thus, have a small mass and considered optically the divergence of the emitted light beam is modified by displacing one of the two lenses in relation to the other. Such a change in the divergence of the light beam leads to a vertical displacement of the focus relative to the data track 72 so that, in reality, a vertical adjustment of the scanning unit 61, 62 . . . $6n$ is superfluous.

In the above described examplary embodiments, particularly emphasis has been placed on the geometry of the arrangement which determines both the optical and mechanical properties of the positioning device and thus, finally, the short access time which can thereby be achieved. As a result of the electronic controls of such a positioning device, known principles can be used to obtain the light signals for the track following and focussing system and accordingly, a known electronic control unit can also be used. Therefore, these have only been described summarily in the above description.

However, it should be also noted that the exact separation of the coarse positioning from the fine positioning offers new possibilities of rendering the control of the positioning process more flexible than hitherto, also in respect to the mechanical optical units used for this purpose. The coarse positioning, in fact, requires only one coarse process since for this phase the positioning is only of a subordinate importance as to the position simultaneously occupied by the selected scanning unit in relation to the track zone assigned thereto. The parallel use of the plurality of scanning units permits, for example, a t.d.m., the actual position of all the scanning units to be simultaneously determined and updated.

With the corresponding organization and control of the read and possibly also the write/read process in an optical disc storage, it would also be conceivable to bring all non-activated scanning units into a predetermined starting position so that each fine positioning process is based on the same precondition. However, it would also be possible to intermediately store the actual position of the scanning unit in the control unit and thus, in combination with an externally supplied item of address information relating to the newly selected data track to control the fine positioning in addition to the coarse positioning. In this context, it would likewise be conceivable if so permitted by the operation of the control unit prior to an intended track change whereby a different scanning unit is to be activated, to preadjust this scanning unit in order to further reduce the delay time. These possibilities have only been hinted at in order to demonstrate in the form of these examples the adaptability and possible power reserves of the desired positioning device.

Although various minor modifications may be suggested by those versed in the art, it should be understood that I wish to employ within the scope of the patent granted hereon, all such modifications as reasonably and properly come within the scope of my contribution to the art.

I claim:

1. In a positioning device for an optical disc storage, said positioning device having a laser light source for creating a light beam, scanning means including means to focus the light beam onto a select information track of an optical storage disc having a disc axis of rotation, a control unit, means for coarse positioning the beam and means for fine positioning the beam, said means for coarse and fine positioning forming a regulating loop in cooperation with a detector arrangement to produce a track error signal and focus error signal, the improvements comprising the storage disc being divided into a plurality of concentric track zones with each zone comprising a plurality of information tracks, the scanning means being sub-divided into a plurality of scanning units with one scanning unit for each of the concentric track zones, said scanning units being arranged one next to the other on a line in a plane parallel to the storage disc, means for displacing each of the units relative to said line, said coarse positioning means comprising a rotatable reflector and means for rotating said reflector on a reflector axis being arranged at a lateral interval from the disc axis, means for directing said light beam in a path in said plane, said rotatable reflector being mounted with a center being in said plane, being aligned with said scanning units and being in the path of light to reflect the light at one of the scanning units, and said means for rotating the reflector rotating the reflector to a position to reflect light on the selected scanning unit.

2. In a positioning device according to claim 1, wherein the line is a segment of a circle having a center at the axis of the rotatable reflector, said scanning units are arranged at regular lateral intervals from one another on said segment of circle relative to the axis of rotation of the rotatable reflector, wherein the radius of said circular segment is greater than the maximum radius of the data track of the storage disc.

3. In a positioning device for an optical disc storage, said positioning device having a laser light source for creating a light beam, means for directing the light beam in a path, scanning means including means to focus the light beam onto a select information track of an optical storage disc, a control unit, means for coarse positioning the beam and means for fine positioning the beam, said means for coarse and fine positioning forming a regulating loop in cooperation with a detector arrangement to produce a track error signal and focus error signal, the improvements comprising the storage disc being divided into a plurality of concentric track zones with each zone comprising a plurality of information tracks, the scanning means being sub-divided into a plurality of scanning units with one scanning unit for each of the concentric track zones, said scanning units being arranged one next to the other on a segment of a circle, means for radially displacing each of the units relative to said segment and including each unit having an individually assigned drive system being controllable by a fine positioning signal and having a predominant mass being fixed to a frame, said coarse positioning means comprising a rotatable reflector and means to rotate said reflector on an axis, said rotatable reflector being mounted in the path of light from said means for directing and reflecting the light at one of the scanning units, said means for rotating the reflector rotating the reflector to a position to reflect light on the selected scanning unit, and each of the scanning units containing an optical focussing system for focussing a beam of light onto the storage disc and an optical element facing towards the rotatable reflector to deflect a light beam from the rotatable reflector through the focusing system onto the disc.

4. In a positioning device according to claim 3, wherein a linear drive system is assigned to each scanning unit and comprises a plunger system having a stationary plunger magnet and movable armature.

5. In a positioning device for an optical disc storage, said positioning device having a laser light source for creating a light beam, means for directing the light beam in a path, scanning means including means to focus the light beam onto a select information track of an optical storage disc, a control unit, means for coarse positioning the beam and means for fine positioning the beam, said means for coarse and fine positioning forming a regulating loop in cooperation with a detector arrangement to produce a track error signal and focus error signal, the improvements comprising the storage disc being divided into a plurality of concentric track zones with each zone comprising a plurality of information tracks, the scanning means being sub-divided into a plurality of scanning units with one scanning unit for each of the concentric track zones, said scanning units being arranged one next to the other on a segment of a circle, said coarse positioning means comprising a rotatable reflector and means to rotate said reflector on an axis at a center of said circle, said rotatable reflector being mounted in the path of light from said means for directing and reflecting the light at one of the scanning units, said means for rotating the reflector rotating the reflector to a position to reflect light on the selected scanning unit, means for displacing each of the units relative to said segment and only mono variantly radially to the axis of the rotatable reflector, the beam path of the laser beam containing a focussing optical device comprising an optical system having at least one lens partially displaceable parallel to the beam path, said focussing optical device modifying the divergence of the laser light beam and, thus, changing the focus of the laser light beam relative to the storage disc.

6. In a positioning device according to claim 5, wherein the focussing optical device consists of two collective focussing lenses, one of said focussing lenses being fixed to the frame and means for mounting the other of the focussing lenses for linear displacement relative to the fixed element.

7. In a positioning device according to claim 6, wherein the means for mounting the other focussing element includes a plunger arrangement comprising a coil magnet which is fixed to the frame and an armature which is permanently connected to the displaceable focussing element.

8. In a positioning device according to claim 5, wherein the focussing optical device consists of a collective focussing element fixedly mounted in a frame, a divergent focussing element, means for adjustably mounting the divergent focussing element in a beam path prior to the collective focussing element and enabling linear displacement relative thereto.

9. In a positioning device according to claim 8, wherein the means for adjustably mounting includes a plunger arrangement having a coil magnet fixed to the frame and an armature permanently connected to the divergent focussing element.

* * * * *